US010417625B2

United States Patent
Shmilovitz (10) Patent No.: US 10,417,625 B2
(45) Date of Patent: Sep. 17, 2019

(54) SYSTEM AND METHODS OF REAL TIME MERCHANT ALERT FOR OFFLINE TRANSACTIONS

(71) Applicant: NCR Corporation, Duluth, GA (US)

(72) Inventor: Eran Shmilovitz, Frisco, TX (US)

(73) Assignee: NCR Corporation, Atlanta, GA (US)

( * ) Notice: Subject to any disclaimer, the term of this patent is extended or adjusted under 35 U.S.C. 154(b) by 762 days.

(21) Appl. No.: 14/693,963

(22) Filed: Apr. 23, 2015

(65) Prior Publication Data
US 2016/0314449 A1 Oct. 27, 2016

(51) Int. Cl.
*G06Q 20/20* (2012.01)
*G06Q 20/04* (2012.01)
*G08B 21/18* (2006.01)
*G08B 25/08* (2006.01)

(52) U.S. Cl.
CPC .......... *G06Q 20/202* (2013.01); *G06Q 20/20* (2013.01); *G08B 21/182* (2013.01); *G08B 25/08* (2013.01)

(58) Field of Classification Search
USPC .......................................................... 705/21
See application file for complete search history.

(56) References Cited

U.S. PATENT DOCUMENTS

| 8,690,054 B1 * | 4/2014 | Cummins | G06Q 30/06 235/379 |
| 2002/0123972 A1 * | 9/2002 | Hodgson | G06Q 20/04 705/72 |
| 2016/0300214 A1 * | 10/2016 | Chaffin | G06Q 20/22 |

* cited by examiner

*Primary Examiner* — Garcia Ade
(74) *Attorney, Agent, or Firm* — Schwegman, Lundberg & Woessner (57) ABSTRACT

Methods of transactions alerting and point-of-sale (POS) terminals are generally described. Offline approved transactions and/or time-out reversals associated with a particular store and/or POS terminal may be detected over a predetermined time period. Whether a particular threshold for each of the offline approved transactions and/or time-out reversals has been reached may be subsequently determined. Once a particular threshold has been reached, an electronic alert indicating a store-wide or a local POS issue may be transmitted to an appropriate internal or external entity. The electronic alert may include information specific to the type of issue as well as specifics about the store and POS terminal encountering the issue.

9 Claims, 3 Drawing Sheets

SYSTEM AND METHODS OF REAL TIME MERCHANT ALERT FOR OFFLINE TRANSACTIONS

TECHNICAL FIELD

Embodiments pertain to electronic transactions. Some embodiments relate to a device, system and method for determining and alerting excessive offline electronic transactions.

BACKGROUND

The use of electronic devices in transactions has increased astronomically in relatively recent history. In particular, electronic point of sale (POS) terminals have been introduced in a variety of locations, such as grocery stores, gas stations and the like. Many of these POS terminals are self service, while others are terminals manned by store personnel. Although the POS terminals usually have a network connection that provides authorization for an electronic transaction, in some cases, the POS terminal is unable to obtain authorization. In such cases, authorization may be granted using personal information of the customer or by the employee. However, at present there is no way for a merchant to know in real-time how many offline transactions and/or time-out reversals are occurring, which may indicate an issue in software, network connectivity or fraud to be addressed immediately.

It would be therefore desirable to capture and alert for offline transaction statistics in real-time.

SUMMARY

The present application generally describes a method of alerting excessive offline electronic transactions, as well as devices and systems to operate in the manner described herein. Point of sale terminals and internal and external devices may both determine whether a particular threshold for the specific type of transaction has been reached and implement an alerting function through a variety of mechanisms to alert an appropriate entity.

In one example of a method of transactions alerting, at least one of offline approved transactions or time-out reversals associated with a particular store are detected over a predetermined time period. Whether the at least one of offline approved transactions or time-out reversals associated with the particular store over the predetermined time period has reached a predetermined threshold may next be determined. In response to determining that the at least one of offline approved transactions or time-out reversals associated with the particular store over the predetermined time period has reached the predetermined threshold, an electronic alert may be transmitted. The electronic alert may indicate that the at least one of offline approved transactions or time-out reversals associated with the particular store over the predetermined time period has reached the predetermined threshold.

In another example, the electronic alert may be transmitted by email and/or short message service to at least one of a predetermined technician or store employee. The electronic alert may instead or in addition be transmitted via a dedicated smartphone application to the at least one of the predetermined technician or store employee.

In another example, whether more than one POS terminal at the store has reached at least one POS threshold for at least one of offline approved transactions or time-out reversals over a predetermined POS time period may be determined. In response to determining that more than one POS terminal at the store has reached the at least one POS threshold for at least one of offline approved transactions or time-out reversals over the predetermined POS time period, offline approval of electronic transactions at at least one of the POS terminals that has reached the at least one POS threshold for at least one of offline approved transactions or time-out reversals over the predetermined POS time period may be disabled.

In another example, after determining whether more than one point of sale (POS) terminal at the store has reached at least one POS threshold for at least one of offline approved transactions or time-out reversals over a predetermined POS time period, a type of issue causing the at least one of offline approved transactions or time-out reversals associated with the particular store over the predetermined time period to have reached the predetermined threshold may be determined. The type of issue may be dependent at least in part on whether more than one POS terminal at the store has reached at least one POS threshold for the at least one of offline approved transactions or time-out reversals over the predetermined POS time period. The type of issue may be indicated in the alert. In another example, the type of issue may be a store-related network issue or individual POS issue.

In another example, the alert may be updated by sending an additional alert in response to determining that the type of issue has changed at least in part from determining that a number of POS terminals at the store that have reached the at least one POS threshold for at least one of offline approved transactions or time-out reversals over the predetermined POS time period has changed.

In another example, the predetermined threshold and the at least one POS threshold for the same period may be different. In this case, the plurality of the POS terminals at the store may have different POS thresholds.

In another example, at least one of audio, visual and tactile feedback may be provided at a POS terminal at the store that has reached a POS threshold for at least one of offline approved transactions or time-out reversals over a predetermined POS time period. The feedback may specifically indicate that the POS terminal has reached the POS threshold for the at least one of offline approved transactions or time-out reversals over the predetermined POS time period.

In another example, a method of transactions alerting may include detecting at least one of offline approved transactions or time-out reversals associated with at least one POS terminal at a store over a predetermined POS time period, determining whether the at least one of offline approved transactions or time-out reversals associated with the POS terminal over the predetermined POS time period has reached a predetermined POS threshold, and in response to determining that the at least one of offline approved transactions or time-out reversals associated with the POS terminal over the predetermined POS time period has reached the predetermined POS threshold, transmitting an electronic alert indicating at least one of a store-wide and a local POS issue to at least one of technician and store employee responsible to address the at least one of a store-wide and a local POS issue.

In another example, at least one of a POS threshold and POS time period may be determined independently for each of a plurality of POS terminals. The alert may be updated dependent on whether multiple POS terminals have each reached the associated POS threshold over the associated POS time.

In another example, the electronic alert may be sent from an electronic payment server via at least one of email, short message service and a dedicated smartphone application to the at least one of technician and store employee.

In another example, an indication of a type of issue may be provided in the alert. The type of issue may comprise at least one of a store-related network issue and individual POS issue.

In another example, the alert may be updated by sending an additional alert in response to determining that the type of issue has changed at least in part from determining that a number of POS terminals at the store that have reached the at least one POS threshold for at least one of offline approved transactions or time-out reversals over the predetermined POS time period has changed.

In another example, at least one of audio, visual and tactile feedback may be provided at the POS terminal. The feedback may specifically indicate that the POS terminal has reached the POS threshold for the at least one of offline approved transactions or time-out reversals over the predetermined POS time period.

In another example, a POS terminal comprises a transceiver and processing circuitry. The processing circuitry may be configured to detect at least one of offline approved transactions or time-out reversals associated over a predetermined POS time period, determine whether the at least one of offline approved transactions or time-out reversals over the predetermined POS time period has reached a predetermined POS threshold, and in response to determining that the at least one of offline approved transactions or time-out reversals over the predetermined POS time period has reached the predetermined POS threshold, cause the transceiver to transmit an electronic alert indicating a type of issue related to the at least one of offline approved transactions or time-out reversals over the predetermined POS time period having reached the predetermined POS threshold to at least one of technician and store employee responsible to address the type of issue.

In another example, the processing circuitry is further configured to update the alert with advancing time dependent on whether the at least one of offline approved transactions or time-out reversals over the predetermined POS time period continues to reach the predetermined POS threshold for consecutive POS time periods.

In another example, the processing circuitry is further configured to configure the transceiver to receive information from at least one other POS terminal, the information comprising a separate POS indication whether the at least one other POS terminal indicates that at least one of offline approved transactions or time-out reversals over another predetermined POS time period has reached another predetermined POS threshold and distinguish between at least one of a store-wide and a local POS issue dependent on the separate POS indication. The type of issue indicated in the electronic alert may be dependent on the separate POS indication.

In another example, the POS terminal may further comprise output circuitry responsive to the processing circuitry. In this case, the processing circuitry may be further configured to provide, via the output circuitry, at least one of audio, visual and tactile feedback specifically indicating that the POS terminal has reached the POS threshold for the at least one of offline approved transactions or time-out reversals over the predetermined POS time period.

In another example, the processing circuitry is further configured to disable offline approval of electronic transactions the POS terminal in response to determining that the POS terminal has reached the POS threshold for at least one of offline approved transactions or time-out reversals over the predetermined POS time period.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
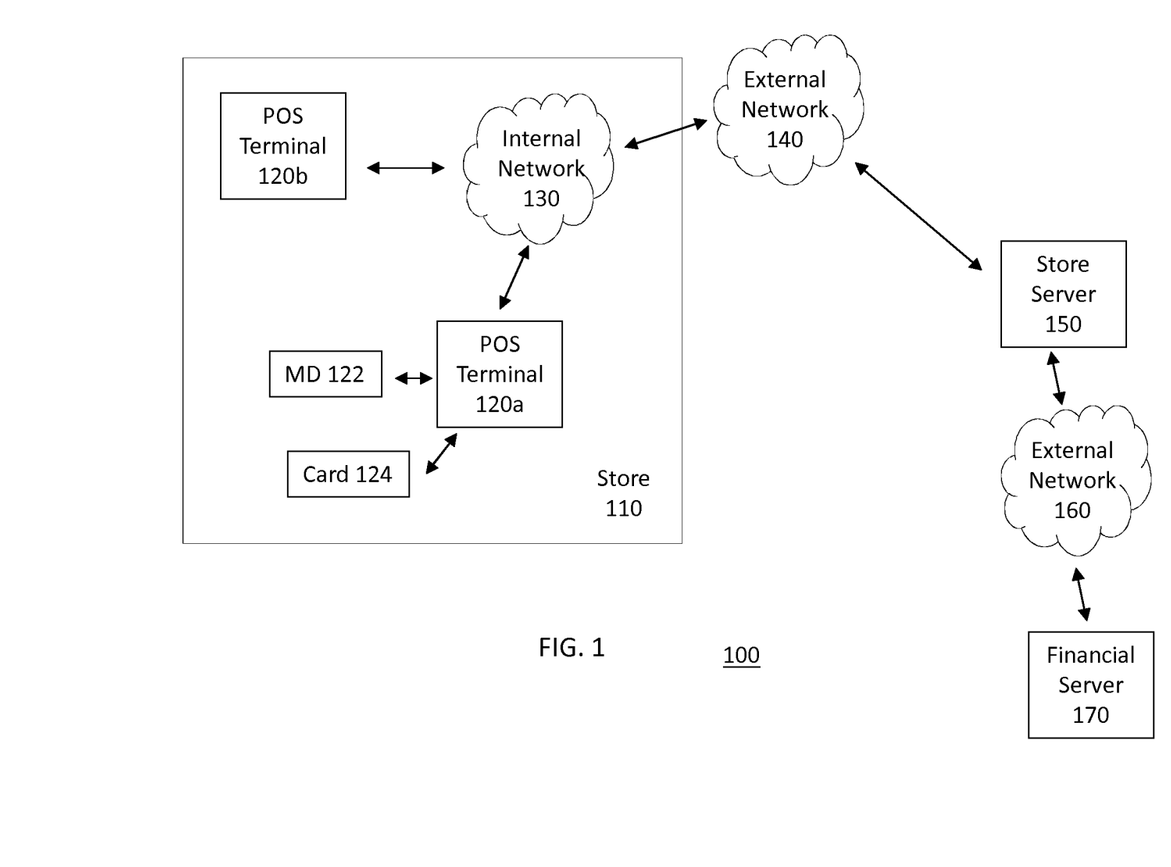
FIG. 1 illustrates one embodiment of a system according to one embodiment.

FIG. 1 illustrates a system 100 offering a variety of services, including communications for various electronic financial actions of individuals in a store 110 or other enterprise. The store 110 may be a bricks-and-mortar type store, providing goods and/or services such as a supermarket or department/specialty store, or an enterprise such as a gas station. The store 110 may have one or more point of sale (POS) terminals 120a, 120b that are configured to receive transaction information from one or more elements. For example, the POS terminal 120a may be configured to receive financial transaction information from the mobile device 122, such as a smartphone, or a financial card, such as a credit, debit, or gift card 124. The POS terminal 120a may be automated, for example, an automated checkout line at a grocery store, or may be manned by an individual. The electronic financial transaction may be contactless, such as via near field communication (NFC) or optical character recognition (OCR), or may use a card reader or other mechanism to read a financial card. The POS terminal 120a may thus obtain financial account-related information from the individual via one or more of a number of input mechanisms.

The POS terminals 120a, 120b may communicate with each other directly or via the internal network 130. The POS terminals 120a, 120b may communicate with other internal and external entities, e.g., via the internal network 130. The POS terminals 120a, 120b may communicate, for example, via one or more micro, pico or nano base stations (BSs). The POS terminals 120a, 120b may communicate with each other and external devices using any of a number of different techniques, such as WiFi, Bluetooth, Zigbee, or 3rd Generation Partnership Project (3GPP) network technologies, among others.

The POS terminals 120a, 120b may capture financial information related to a transaction and attempt to confirm the information by transmitting the captured financial information to one or more servers via at least one of an internal network 130 and one or more external networks 140, 160. In various embodiments, the networks 130, 140, 160 may be wired or wireless networks and one or more of the networks 130, 140, 160 may not be present. Other equipment, such as base stations, routers, access points, gateways and the like used in communicating through the networks 130, 140, 160 are not shown for convenience. The external networks 140, 160 may be, for example, the internet or a private network.

The financial information may include account number, individual identity, amount of transaction, and balance on card (if the card is a prepay or gift card, for example) among others. The financial information transmitted by the POS terminals 120a, 120b through the internal network 130 and external network 140 may be encrypted using one or more of any of a number of encryption schemes. The POS terminal 120a may transmit the financial information through a virtual private network or other tunneling mechanism established between the POS terminals 120a, 120b and one or more of the servers.

As shown, one of the servers may be a store server 150 while another of the servers may be a financial server 170. Each server 150, 170 may typically be implemented on many similar platforms on a distributed basis. The store server 150 may be a server associated with the store 110. The store server 150 may receive financial and other transactional information, such as store location, store number, lane/POS terminal identifier, and clerk identifier as well as other information specific to the transaction. The store server 150 may adjust inventory based on the purchase and retain information on clients and client accounts while the financial server 170 may confirm financial information. The store server 150 may, for example, provide inventory characteristics and make decisions based on the transmitted transaction or may determine whether shifting inventory between stores is desirable based on the transaction. The store server 150 may decrypt the information provided from the POS terminal 120a and store the non-financial information. The store server 150 may then encrypt the financial information before transmitting the financial information through the external network 160 to the financial server 170. The external networks 140, 160 may be the same or may be entirely or partially different. In other embodiments, rather than a dedicated server being used as either or both servers, a cloud network/storage center can be used.

The financial server 170 may be associated with the financial institution used by the store, e.g., a financing institution or store brand card, or the financial institution used by the individual attempting the goods or services transaction at the store 110. The financial server 170 may receive and decrypt the financial information from the store server 150 that is used in the transaction at the store 110. The financial server 170 may validate whether the received financial information is associated with the individual and/or the credit line or funds available to the individual, for example. The financial server 170 may then provide an appropriate response to the store 110 (or a merchant associated with the store) via the store server 150 and networks 130, 140, 150. In other embodiments, the financial server 170 may provide the response directly to the POS terminal 120a. The financial server 170 may decide to allow or deny the transaction based on a number of factors, with the response reflecting the decision. If the response contains financial information in addition to authorization information, the response may also be encrypted and decoded at the store 110, for example, by the POS terminal 120a. In one embodiment, the POS terminal 120a may contain an electronic payment system that performs a financial transaction based on a transaction of the POS terminal 120a and that determines the offline transaction and/or time-out reversal, while in other embodiments the POS terminal 120a may be in communication with a local electronic payment system.

The financial server 170 and/or store server 150 may also trigger an alert or bill notification upon the transaction being either or both completed or interrupted. The individual may receive an alert message on a device, such as the mobile device 122, that is registered to receive alerts from the merchant associated with the store server 150 or the financial institution associated with the financial server 170. The individual may receive an alert message on a mobile device 122 via an email, short message service (SMS), enhanced messaging service (EMS), multimedia messaging service (MMS) or dedicated application on the mobile device 122 or another device. The application, as others described herein, may be for any platform, such as for the Android, Apple or Microsoft operating systems. Depending on the transaction, the mobile device 122 or POS terminal 120a may also request confirmation from the user of the transaction prior to the purchase being completed. A multi-step authorization may be used dependent on a set of rules stored in the POS terminal 120a, store server 150, financial server 170, or other server in communication with the system. The rules may be based on the financial institution, type of card, type of transaction, amount of transaction, merchant, location and time, among others. The financial server 170 may request, for example, the POS terminal 120a or employee operating the POS terminal 120a to confirm identification presented by the individual, entry of a billing zip code or personal identification number (PIN) by the individual or signature of the individual. The financial server 170 may not authorize the transaction and/or the transaction may not be completed until the individual separately confirms a response on the mobile device 122.

The financial server 170 may not authorize the transaction for a number of reasons. In some cases, the lack of authorization may be individual related, such as the individual may not have sufficient funds (although partial approval is still possible), the account may be frozen due to potential fraud issues, or the transaction involves a detected fraudulent activity (e.g., use of a fraudulent card). Other issues may arise due to the inability of the POS terminal 120a to communicate with the store server 150 or the store server 150 being unable to communicate with the financial server 170. These may arise from one or more of the networks 130, 140, 160 having connectivity issues or bugs in the software on the POS terminal 120a. In these situations, a timeout reversal may occur. Timeout reversal is a situation in which the authorization process has started but not completed within a predetermined amount of time. Although the transaction does not go through, a separate cancellation step may be taken by a store employee before the POS terminal 120a is able to be used for the next transaction.

However, even if the electronic financial transaction is denied or times out, the transaction may be approved locally, at the store 110. These transactions are called offline transactions. Similar to the multi-step authorization process, a set of local approval rules may be based on the financial institution, type of card, type of transaction, amount of transaction, merchant, location and time. The local approval rules and multi-step authorization rules may be different. For example, multi-step authorization may be used for transactions in excess of a first predetermined amount, while local authorization may be available for amounts less than a second predetermined amount. For returns, a signature may be used in a multi-step authorization procedure, while if a timeout reversal occurs, the store may be allowed to complete the process locally without a signature. The offline transaction information may be stored in, for example, a flat file, in the POS terminal 120*a* or in another electronic device. The other electronic device may be local to the store and may communicate separately with the store server 150. If there is a network connectivity issue between the POS terminal 120*a*/store and the store server 150, the device storing the offline transaction information may store all offline transaction information and transmit the offline transaction information when a connection to the store server 150 becomes available. The transmission may be batched or may be transmitted incrementally in periodic time periods after connectivity is restored. In another embodiment, the POS terminal 120*a* may store a certain amount of offline transaction information and then use the local device to store additional offline transaction information. In another embodiment, if there is a network connectivity issue between the store server 150 and the financial server 170, the offline transaction information may be stored in the store server 150. The store server 150 may similarly batch or incrementally transmit the offline transaction information to the financial server 170.

Typically, the store or other entity with which the store is associated may be unable to determine the amount of offline transactions until well after they occur, leading to the potential for a significant amount of fraud. Furthermore, the electronic or paper receipt received the customer does not in general indicate whether the local authorization was used during the transaction. To combat this, application software on the POS terminal may add or otherwise adjust the format of the transaction information to indicate that local authorization was used. Authorization codes used in an approval process in which the financial server provides authorization typically each contain a string of numbers, which are set using a predetermined generation algorithm known to the financial institution. In one embodiment, if local authorization is used, a prefix of one or more letters may be added to an authorization string that is set using the same algorithm, or a different algorithm known to the financial institution and the store. The algorithm used to generate the authorization code may depend on the financial institution, card used, store, time/date and location, for example.

In one embodiment, as soon as an offline transaction and/or time-out reversal occurs, the special code is generated and the offline transaction or time-out reversal information is stored/transmitted. The device storing the offline transaction or time-out reversal information determines whether a predetermined threshold of a predetermined number of offline transactions or time-out reversals over a predetermined time period has been met. The time period may be rolling such that each time an offline transaction or time-out reversal occurs the device again determines whether the predetermined threshold has been met. In different embodiments, the thresholds (number and/or period) for different POS terminals within the store may be the same or at least some may be different. For example, the threshold for a more heavily used automatic checkout lane may be higher than for a less well used manned checkout lane in a grocery store. In addition, different thresholds may be used for POS terminals and for an overall store. Separate thresholds may exist for offline transactions or time-out reversals, or a single threshold may be used. The threshold may be predetermined or may be configurable and the POS terminal or other device deciding whether the threshold has been met periodically updated with new thresholds. The threshold may vary dependent on, for example, the history of the store and/or POS terminal, employee at the POS terminal, time or date.

In one embodiment, once the threshold has been reached an electronic alert or notification may be transmitted. The alert or notification may be transmitted by the local or remote storage device that stores the offline transaction and time-out reversal information, or from a separate device in communication with the local or remote storage device. In different embodiments, the alert or notification may be transmitted to a predetermined target or targets such as a predetermined individual or group of individuals, depending on which threshold has been exceeded. For example, the alert or notification may be transmitted a technician responsible for connectivity issues, a software engineer responsible for taking care of software bugs (either or both of which can be employees of the store or employees of a different company) or a store employee such as a manager. The target may receive an alert message on a computer or mobile device via an email, SMS, EMS, MMS, dedicated application, or automated phone call. The alert or notification may include the information used by the target to take action, such as the type of threshold, issue causing the alert (e.g., store-related network issue or individual POS issue), location and time. In addition, the alert or notification may be transmitted to the POS terminal to trigger an automated (or manual) response in the POS terminal. The POS terminal response may include audio, visual and/or tactile feedback indicating that the POS terminal has reached the POS threshold. The feedback may be individualized for threshold level and/or type (offline approved transactions or time-out reversals). Alternatively, the determination that the threshold has been reached may trigger the response in the POS terminal. The response may be to limit either offline transactions or any transaction from occurring on the POS terminal, at least without further supervision. The alert or notification may be updated as time passes to indicate a change in, or persistence of, the issue. Different thresholds may be set with escalating effects. For example, as the number of offline transactions and/or time-out reversals increases, the frequency, language or other escalation (e.g., coloring) of the alert or notification may increase. In addition, other parties may be alerted so that, for example, the assistant manager is first alerted and then both the assistant manager and manager are alerted. In other embodiments, a simple counter or dashboard of offline transaction and/or time-out reversal for different POS terminals and stores may be provided to an authorized party. This permits real-time or near real time realization of statistics related to offline transactions and/or time-out reversals.

Figure 2:
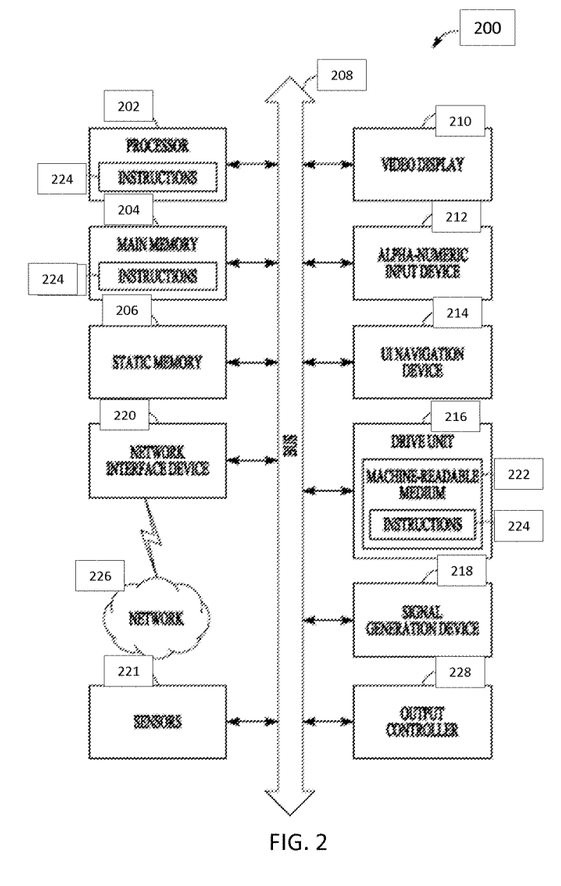
FIG. 2 illustrates a functional block diagram of a POS terminal in accordance with an embodiment.

FIG. 2 illustrates a block diagram of the POS terminal in accordance with some embodiments. In some embodiments the machine may be a computer configured to perform any one or more of the techniques during transaction events discussed herein. In alternative embodiments, the POS terminal 200 may operate as a standalone device or may be connected (e.g., networked) to other computers. In a networked deployment, the POS terminal 200 may operate in the capacity of a server, a client, or both in server-client network environments. In an example, the POS terminal 200 may act as a peer machine in peer-to-peer (P2P) (or other distributed) network environment. The POS terminal 200 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

POS terminal 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. Although not shown, the main memory 204 may contain any or all of removable storage and non-removable storage, volatile memory or non-volatile memory. The POS terminal 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The POS terminal 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The POS terminal 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the POS terminal 200. In an example, one or any combination of the hardware processor 202, the main memory 204, the static memory 206, or the storage device 216 may constitute machine readable media.

While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the POS terminal 200 and that cause the POS terminal 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226.

Figure 3:
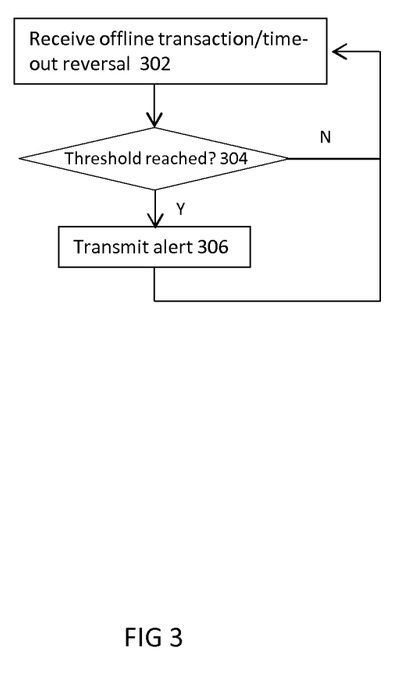
FIG. 3 illustrates a flowchart of a method of providing alerts in accordance with some embodiments.

FIG. 3 illustrates a flowchart of a method of providing alerts in accordance with some embodiments. At step 302, the POS terminal or other local device determines that a POS terminal has offline transaction and/or time-out reversal has occurred. The local authorization code may contain a prefix of one or more letters or other another easily recognizable modification of the non-local authorization format. At step 304, the POS terminal or other local device determines whether a predetermined threshold of a predetermined number of offline transactions or time-out reversals has been met for a predetermined rolling time period. The thresholds (number and/or period) for different POS terminals within a particular store or enterprise may be the same or at least some may be different. Alternately, an overall threshold for the store or enterprise may be used. The threshold may be predetermined or may be configurable and the POS terminal or other device deciding whether the threshold has been met periodically updated with new thresholds. At step 306, once the threshold has been reached an electronic alert or notification may be transmitted. The target of the alert or notification may receive an alert message on a computer or mobile device via an email, SMS, EMS, MMS, dedicated application, or automated phone call. The alert or notification may include the information used by the target to take action, such as the type of threshold, issue causing the alert (e.g., store-related network issue or individual POS issue), location and time. The system may then returns to step 302, when the next offline transaction and/or time-out reversal is received.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 1507 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of transactions alerting, the method comprising:
   adjusting a format of an authorization string of an approved transaction at a point of service (POS) terminal in a particular store to indicate an offline approved transaction in which local authorization was used, the authorization string adjusted by at least one of adding a prefix to the authorization string or changing an algorithm to generate the authorization string such that different algorithms are used to generate the authorization string dependent on whether local or remote authorization is used, each algorithm dependent on a financial institution of a credit card used, the particular store, and a time, a date and a location at which the credit card was used;
   detecting at least one of offline approved transactions or time-out reversals associated with at least one of the POS terminal or the particular store over a predetermined time period, detection of the offline approved transactions based on authorization string formats of approved transactions;
   determining whether the at least one of offline approved transactions or time-out reversals has reached a predetermined threshold number of at least one of offline approved transactions or time-out reversals; and
   in response to determining that the at least one of offline approved transactions or time-out reversals has reached a predetermined threshold, transmitting an electronic alert indicating that the at least one of offline approved transactions or time-out reversals has reached the predetermined threshold.

2. The method of claim wherein transmitting the electronic alert comprises at least one of:
   sending the alert via at least one of email and short message service to at least one of a predetermined technician or store employee; and
   sending the electronic alert via a dedicated smartphone application to the at least one of the predetermined technician or store employee.

3. The method of claim wherein:
   at least one of the detecting, determining and transmitting is performed by an electronic payment server.

4. The method of claim 1, further comprising:
   determining whether more than one POS terminal at the store has reached at least one POS threshold for at least one of offline approved transactions of time-out reversals over a predetermined POS time period; and
   in response to determining that more than one POS terminal at the store has reached the at least one POS threshold for at least one of offline approved transactions or time-out reversals over the predetermined POS time period, disabling offline approval of electronic transactions at at least one of the POS terminals that has reached the at least one POS threshold for at least one of offline approved transactions or time-out reversals over the predetermined POS time period.

5. The method of claim 1, further comprising:

determining whether more than one POS terminal at the store has reached at least one POS threshold for at least one of offline approved transactions or time-out reversals over a predetermined POS time period;

determining a type of issue causing the at least one of offline approved transactions or time-out reversals associated with the particular store over the predetermined time period to have reached the predetermined threshold dependent at least in part on whether more than one POS terminal at the store has reached at least one POS threshold for the at least one of offline approved transactions or time-out reversals over the predetermined POS time period; and providing an indication of the type of issue in the alert.

6. The method of claim 5, wherein:

type of issue comprises a store-related network issue of individual POS issue.

7. The method of claim 5, further comprising:

updating the alert by sending an additional alert in response to determining that the type of issue has changed at least in part from determining that a number of POS terminals at the store that have reached the at least one POS threshold for at least one of offline approved transactions or time-out reversals over the predetermined PUS time period has changed.

8. The method of claim 5, wherein at least one of:

the predetermined threshold and the at least one POS threshold for the same period are different; and a plurality of the POS terminals at the store have different POS thresholds.

9. The method of claim 1, further comprising:

providing, at the POS terminal at the store that has reached a POS threshold for at least one of offline approved transactions or time-out reversals over a predetermined POS time period, at least one of audio, visual and tactile feedback specifically indicating that the POS terminal has reached the POS threshold for the at least one of offline approved transactions or time-out reversals over the predetermined POS time period.

* * * * *